(12) United States Patent
Marque-Pucheu et al.

(10) Patent No.: US 6,459,742 B1
(45) Date of Patent: Oct. 1, 2002

(54) DIGITAL MODULATION PROCESS AND MODULATOR IMPLEMENTING THE PROCESS

(75) Inventors: Gérard Marque-Pucheu, Paris; Albert Roseiro, Courbevoie, both of (FR)

(73) Assignee: EADS Defence and Security Networks, Montigny-le-Bretonneux (FR)

(*) Notice: Subject to any disclaimer, the term of this patent is extended or adjusted under 35 U.S.C. 154(b) by 0 days.

(21) Appl. No.: 09/244,422

(22) Filed: Feb. 4, 1999

Related U.S. Application Data

(63) Continuation-in-part of application No. 09/127,888, filed on Aug. 3, 1998, now abandoned.

(30) Foreign Application Priority Data

Aug. 4, 1997 (FR) ............................................. 97 09962

(51) Int. Cl.[7] .......................... H04L 25/03; H04L 27/20
(52) U.S. Cl. ........................ 375/308; 332/103; 332/144
(58) Field of Search ............................... 375/265, 279, 375/281, 284, 285, 295, 296, 297, 308; 332/100, 103, 144; 455/126; 708/271

(56) References Cited

U.S. PATENT DOCUMENTS

| | | | | |
|---|---|---|---|---|
| 5,225,795 A | * | 7/1993 | Iinuma ........................ | 332/100 |
| 5,311,552 A | | 5/1994 | Chennakeshu et al. ........ | 375/39 |
| 5,311,553 A | * | 5/1994 | Chennakeshu et al. ...... | 375/265 |
| 5,600,676 A | * | 2/1997 | Ramesh ....................... | 375/283 |
| 5,633,893 A | * | 5/1997 | Lampe et al. ................. | 375/297 |
| 5,642,384 A | * | 6/1997 | Ramesh ....................... | 375/265 |
| 5,696,795 A | * | 12/1997 | Williams et al. ............. | 375/308 |
| 5,754,597 A | * | 5/1998 | Lurey et al. .................. | 375/295 |
| 5,834,985 A | * | 11/1998 | Sundegard ................... | 332/100 |
| 5,864,492 A | * | 1/1999 | Sadot .......................... | 708/270 |
| 5,864,585 A | * | 1/1999 | Erisman ...................... | 375/272 |
| 5,878,335 A | * | 3/1999 | Kushner ...................... | 455/260 |
| 5,945,885 A | * | 8/1999 | Schwartz et al. ............ | 332/100 |
| 6,025,758 A | * | 2/2000 | Lu .............................. | 332/100 |
| 6,031,865 A | * | 2/2000 | Kelton et al. ................ | 375/130 |

FOREIGN PATENT DOCUMENTS

| | | | |
|---|---|---|---|
| EP | 0 494 696 A2 | 7/1992 | ........... H04L/27/20 |
| EP | 0 633 680 A1 | 1/1995 | ........... H04L/27/18 |
| EP | 0 633 681 A1 | 1/1995 | ........... H04L/27/20 |
| FR | 2 675 001 A1 | 10/1992 | ........... H04L/27/20 |

OTHER PUBLICATIONS

French Search Report dated May 14, 1998.
Ungerboeck, G., *Channel Coding with Multilevel/Phase Signals*, IEEE Transactions on Information Theory, Jan. 1982, vol. IT–28, No. 1, pp. 55–67.

\* cited by examiner

*Primary Examiner*—Young T. Tse
(74) *Attorney, Agent, or Firm*—McCracken and Frank

(57) ABSTRACT

The successive symbols of a digital stream are converted into phase increments which are accumulated. A modulating phase is obtained by filtering the accumulated phase. A complex signal is produced whose argument represents the modulating phase. Two quadrature radio waveforms are respectively modulated on the basis of that complex signal, and a radio signal resulting from a combination of the two modulated waveforms is transmitted. The complex signal may be filtered digitally. Its real and imaginary components are converted into analog form, and are subjected to anti-aliasing analog filtering and then mixed with the two radio waveforms. Appropriate sizing of the digital filters provides efficient modulation with small envelope variations, causing little adjacent channel interference and a low error rate.

25 Claims, 3 Drawing Sheets

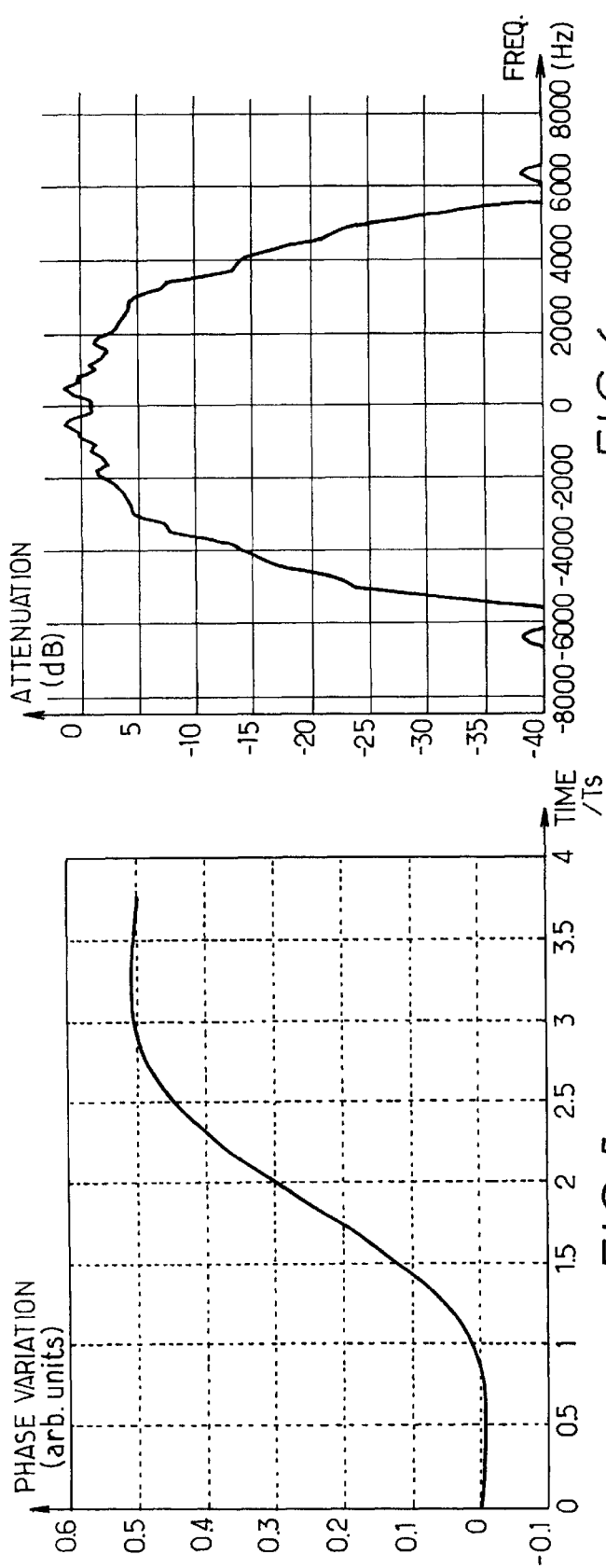
FIG.6.
FIG.5.
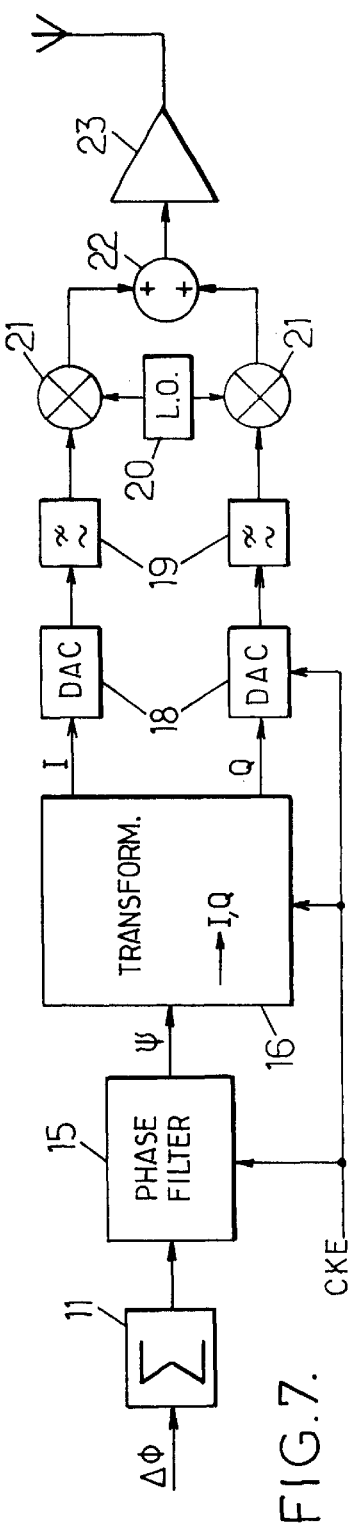
FIG.7.

DIGITAL MODULATION PROCESS AND MODULATOR IMPLEMENTING THE PROCESS

CROSS REFERENCE TO RELATED APPLICATION

This is a continuation-in-part of U.S. Ser. No. 09/127,888, filed Aug. 3, 1998, now abandoned.

BACKGROUND OF THE INVENTION

This invention concerns digital radio communication systems. It concerns, in particular, the methods of modulation implemented in such systems.

Digital modulation is generally designed to combine the following three requirements: a high transmission rate, minimum spectrum occupancy and a low transmission error rate under various operating conditions.

Various methods were proposed in the past with a view to achieving a high transmission rate on a channel with reduced spectral bandwidth (transmission rate exceeding 1 bits/Hz).

The first group of methods uses multi-level frequency modulation as a basis, together with adequate filtering of the modulating signal (e.g. Gaussian filtering used with GMSK modulation) in order to reduce adjacent channel interference. These methods have the advantage that they are easily applied, and result in modulated signals of constant envelope. They consequently permit transmitters to be fitted with power amplifiers which operate in the saturated state. These amplifiers are readily available, cheap and very efficient. However, in order to comply with constraints relating to adjacent channel interference, the modulation index must be limited considerably, and the modulating signal thoroughly filtered. This causes the symbol spacing to be reduced, and this adversely affects the noise immunity of the modulation. In other words, the sensitivity of the radio receivers is limited.

Another group of methods uses phase-shift keying (PSK) and, if necessary, differential phase shift keying (DPSK) as a basis, and the resulting signal is filtered to ensure that standards relating to adjacent channel interference are complied with. In general, a filter satisfying the Nyquist criterion is used in order to limit inter-symbol interference. These methods generally provide satisfactory sensitivity at the expense of a large variation in the amplitude of the radio signal. Very linear amplifiers are therefore necessary, and they are difficult to design and set up. In addition, they are generally inefficient, and this seriously affects the autonomy of mobile stations. A non-linear amplifier can be used in conjunction with a linearizing method, but such method complicates a transmitter very considerably if there are large envelope variations.

Other solutions have also been proposed, e.g. in U.S. Pat. Nos. 5,642,384 and 5,311,552, where an appropriate choice of a constellation and of a coded modulation process prevents transitions in the constellation for which the phase change is relatively large. This permits the variation in amplitude of a radio signal to be reduced to values compatible with the characteristics of amplifiers which are easier to design. However, the reduction in amplitude is achieved at the expense of a considerable reduction in the symbol spacing, which is very difficult to compensate by coding gains, in particular in the error rate range of the greatest importance to speech communications, i.e. for bit error rates (BER) of the order of $10^{-2}$, especially when the channel is affected by fading (Rayleigh fading).

An object of the present invention is to propose a digital modulation group permitting joint optimisation of noise immunity, even in a channel affected by fading, adjacent channel interference, and variation in amplitude of the radio signal.

SUMMARY OF THE INVENTION

The invention thus proposes a digital modulation process wherein the successive symbols of a digital stream are converted into phase increments, an accumulated phase is obtained by adding the successive phase increments, a modulating phase is obtained by filtering the accumulated phase, a complex signal is produced whose argument represents the modulating phase, two phase quadrature radio waveforms are respectively modulated on the basis of said complex signal, and a radio signal resulting from a combination of the two modulated waveforms is transmitted. According to the invention, said complex signal is digitally filtered, and digital signals obtained from the real and imaginary components of the digitally filtered complex signal are converted into analog form before being respectively subjected to anti-aliasing analog filtering and then mixed with the two radio waveforms.

Said digital signals obtained from the real and imaginary components of the digitally filtered complex signal typically consist of the real and imaginary components themselves. However, if an amplifier linearizing process is used, by pre-distortion for example (see European patent application No. 0 797 293), the real and imaginary components may be subject to correction before being converted into analog form. The use of a linearizing process is not included directly in this invention. In many cases, the invention will permit such a process to be dispensed with. In other cases, it will permit the use of such processes to be simplified considerably (for example, by not taking account of phase changes), in view of the small variations in the signal envelope permitted by an appropriate choice of parameters for filtering the accumulated phase and said real and imaginary components. The criteria for this selection will be specified further on.

The invention permits digital radio communication systems, in particular professional radio communication systems, to be implemented in accordance with applicable standards relating to adjacent channel interference, and provides unequalled sensitivity and thus radio range, using power amplifier components which are readily available on the market and have a high power efficiency.

Another aspect of the invention relates to a digital modulator, including means for converting successive symbols of a digital stream into phase increments, a summator which accumulates the successive phase increments to produce an accumulated phase, a phase filter receiving the accumulated phase and producing a modulating phase, means for producing a complex signal whose argument represents the modulating phase, and a modulator for respectively modulating two phase quadrature radio waveforms on the basis of said complex signal, and for transmitting a radio signal resulting from a combination of the two modulated waveforms, the modulator comprising a digital filter to which the complex signal is applied, digital-to-analog converters respectively processing the digital signals obtained from the real and imaginary components of the digitally filtered complex signal, anti-aliasing analog filters receiving the output signals from the digital-to-analog converters, and two mixers each receiving one of the two radio waveforms and the output signal from one of the two anti-aliasing filters.

According to another aspect of the invention, there is provided a digital modulation process, comprising the steps of:

converting successive symbols of a digital stream into phase increments;

obtaining an accumulated phase by adding the successive phase increments;

obtaining a modulating phase by filtering the accumulated phase;

producing a complex signal having an argument representing the modulating phase;

modulating two quadrature radio waveforms, respectively, on the basis of said complex signal; and transmitting a radio signal resulting from a combination of the two modulated waveforms, wherein the step of obtaining the modulating phase includes the step of filtering the accumulated phase in a phase filter with a finite impulse response having both positive and negative terms, and wherein the phase filter has a frequency response providing an attenuation substantially higher than 3 dB for a frequency excursion of $1/(2T_s)$, where $T_s$ is the symbol period in the digital stream.

The response of such phase filter advantageously corresponds to a time characteristic having the form:

$$g(t)=\mathrm{Sinc}(\alpha' t/T_s).\mathrm{Sinc}(\beta' t/T_s).e^{-(\pi\gamma' t/T_s)^2},$$

where $\alpha'$, $\beta'$ and $\gamma'$ are real coefficients, and Sinc( ) is the cardinal sine function. When $T_s=125$ $\mu$s and each symbol of the digital stream consists of two bits, with phase increments of $-\pi$, $-\pi/3$, $\pi/3$ or $\pi$, preferred values of the response coefficients are $\alpha'\approx 0.77$, $\beta'\approx 0.5$ and $\gamma'\approx 0$.

BRIEF DESCRIPTION OF THE DRAWINGS

FIGS. 5 and 6 are graphs respectively showing the time evolution of a filtered phase increment at the output of a phase filter in a digital modulator according to the invention and the frequency response of such phase filter.

FIG. 7 is a block diagram of another embodiment of the digital modulator in accordance with the invention.

DESCRIPTION OF PREFERRED EMBODIMENTS

Figure 1:
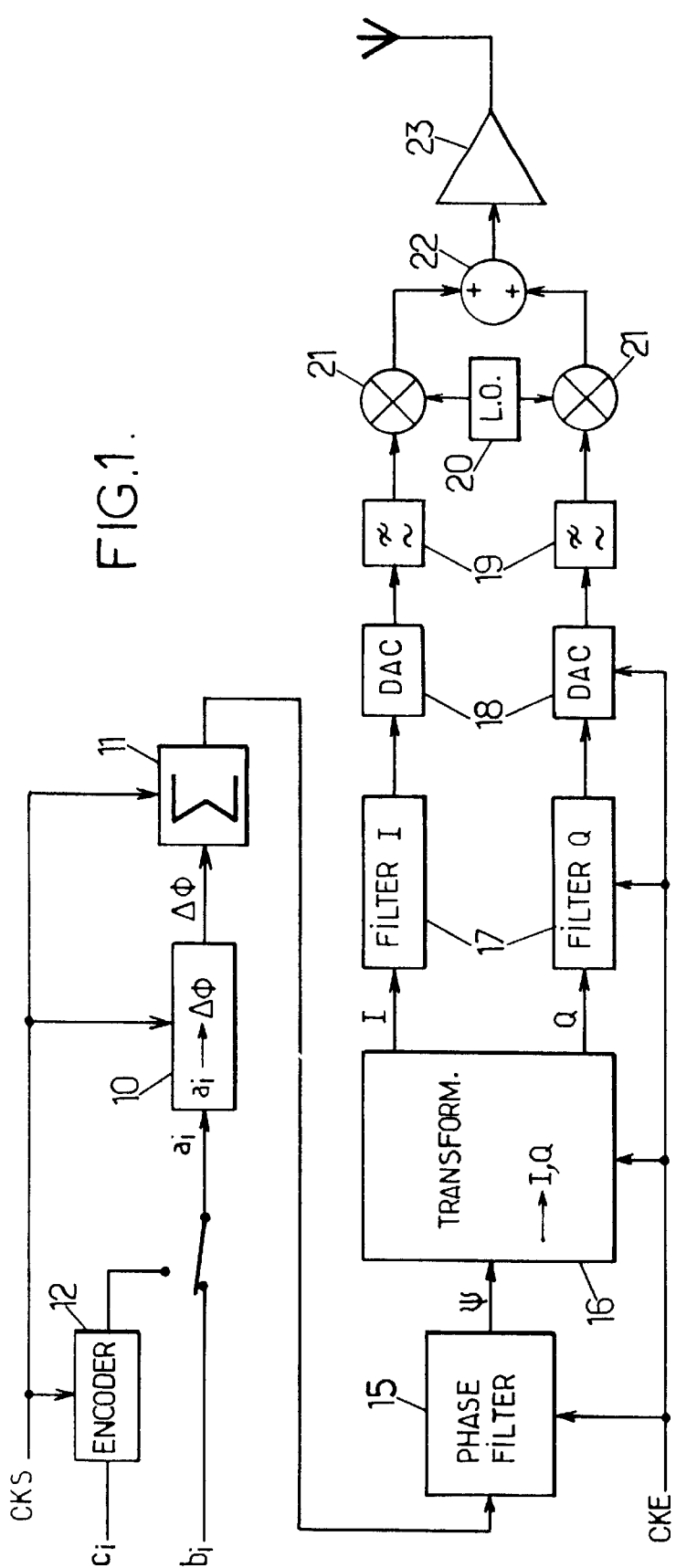
FIGS. 1 and 2 are block diagrams of a digital modulator in accordance with the invention and an associated receiver respectively.

The modulator shown in FIG. 1 comprises a unit 10 which converts the successive symbols $a_i$ of a digital stream into phase increments $\Delta\phi$. The successive phase increments $\Delta\phi$ produced by the unit 10 are accumulated by a summator 11. The unit 10 may merely consist of a register containing the possible values of the phase increments $\Delta\phi$ and addressed by the current value of the symbol $a_i$.

In the embodiment of FIG. 1, the symbol stream $a_i$ may correspond either to a bit stream $b_i$ or another bit stream $c_i$ having with a lower transmission rate, processed by a redundancy encoder 12. The bit streams $b_i$ and $c_i$ derive from digital sources such as speech encoders, data sources, etc., generally with error correction coding applied. If the encoder 12 is used., the modulator of FIG. 1 operates in accordance with a coded modulation (see G. Ungerboeck "Channel coding with multi-level/phase signals", IEEE Trans. on Information Theory, Vol. IT-28, No. 1, January 1982, pages 55–67). The unit 10, summator 11 and encoder 12 are timed by a clock signal CKS at the frequency $1/T_s$ of the symbols $a_i$.

The summator 11 stores a integer digital value k representing an accumulated phase. This accumulated phase is thus stored as whole multiples of a sub-multiple of $\pi$, that is to say in the general form $(k/P)\pi$. For each cycle of the clock CKS, the accumulated phase is incremented by a value $\Delta\phi$ depending on the current symbol $a_i$. If each symbol represents m bits, $M=2^m$ different values of the increment may be added in each cycle. These M values are chosen so that the set of the increments is symmetrical with respect to the value 0 so that the spectrum is symmetrical. Values of k of the type $k=k'\times K$ will typically be used, where $K/P$ represents the modulation index, and $k'=-M+1, -M+3, \ldots, -1, 1, \ldots, M-3$ or $M-1$. This choice of equally distributed increments is not the only one possible. For example, $k'=-7, -3, 3$ or 7 could also be used if m=2. $\Delta\phi_{max}=(k_{max}/P)\pi$ designates the maximum value of the phase increment $\Delta\phi$.

The accumulated phase is fed to a digital filter 15, referred to as phase filter, whose sampling frequency $1/T_e$, set by a clock signal CKE, is higher than the frequency $1/T_s$ of the symbols $a_i$ (generally a multiple of that frequency).

The output signal from the phase filter 15 is a modulating phase $\Psi$, which a unit 16 converts into a complex signal, i.e. into two real signals, one (I) representing the real component of the complex signal, and the other (Q) representing the imaginary component.

That complex signal has a constant modulus, and an argument equal to the modulating phase $\Psi$. In other words, $I=\cos\Psi$ and $Q=\sin\Psi$. The unit 16 may merely consist of two read-only memory arrays addressed by the output of the filter 15 at every cycle of clock CKE.

The complex signal is filtered by a digital filter which, in the embodiment shown, consists of two identical filters 17 which respectively filter the components I and Q.

Two digital-to-analog converters 18 convert the output signals of the two filters 17 into analog form. The two resulting analog signals are fed to low-pass filters 19 in order to eliminate spectral aliasing components. Using respective mixers 21, two quadrature radio waveforms at the carrier frequency, deriving from a local oscillator 20, are mixed with the signals deriving from the anti-aliasing filters 19. The two waveforms thus modulated are combined by a summator 22 whose output is fed to the power amplifier 23 of the transmitter.

If the amplifier 23 were linearized by pre-distortion, it would be necessary to correct the filtered components I and Q, between the filters 17 and converters 18, before converting them into analog form.

Figure 2:
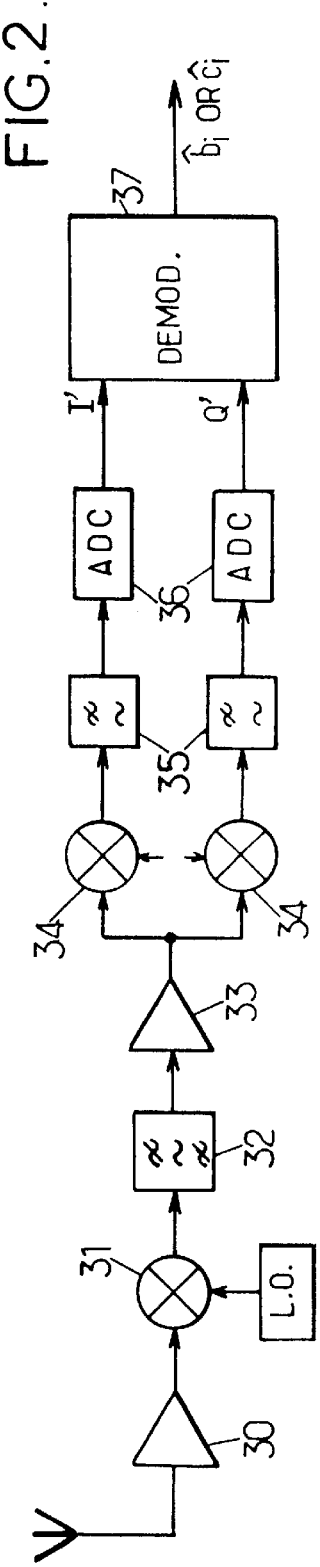

The receiver shown in FIG. 2 includes a low-noise amplifier 30 which amplifies the signal picked up by the antenna. Its output is converted to an intermediate frequency using a mixer 31. A band-pass filter 32 processes the intermediate frequency signal which is then amplified further by an amplifier 33. Two other mixers 34 provide baseband conversion by mixing with two quadrature waveforms. The two quadrature analog components deriving from the mixers 34 are fed to identical low-pass filters 35, then converted into digital form by analog-to-digital converters 36. The digital components I' and Q' deriving from the converters 36 are fed to a channel demodulator 37.

The demodulator 37 carries out demodulating operations corresponding to the incomplete modulator consisting of the components 10, 11, 15, 16 and (if necessary) 12 of the transmitter shown in FIG. 1. Since this incomplete modulator essentially performs continuous phase modulation (CPM), the demodulator 37 may take the form of a conventional CPM demodulator. It may, for example, be based on a demodulation trellis in order to apply the Viterbi algorithm. The demodulator 37 delivers estimates $\hat{b}_i$ or $\hat{c}_i$ of the bits $b_i$ or $c_i$ fed to the modulator.

Advantageously, the demodulator 37 may include two trellis. It uses either one of the trellis, depending on whether the encoder 12 is used at the transmitter or not. The first trellis includes modulation states. In principle, the number of these states is $M^{L-1} \times P$, where L is the memory of the phase filter 15 expressed in number of samples, M is the number of points on the constellation, and P is the denominator of the modulation index. However, it is generally possible to considerably reduce the number of states of the demodulation trellis without adversely affecting the quality of reception significantly. The second one of the trellis further includes the coding states of the redundancy encoder 12, in accordance with the principle of coded modulations. This second trellis is employed if the encoder 12 is used at the transmitter.

In the modulator design, the values of the phase increments $\Delta\phi$ are first chosen, as indicated hereabove. The filter 17 which processes the components I and Q and determines the spectral characteristics of the resulting signal is then constructed. The characteristics of this filter 17 must be as close as possible to those of the receiving filter consisting of the combination of filters 32 and 35.

An advantageous form of the digital filters 17, used to process the components I and Q, is a filter with a finite impulse response selected to most closely fit a time characteristic of the form:

$$f(t) = \text{Sinc}(\alpha t/T_s) \cdot \text{Sinc}(\beta t/T_s) \cdot e^{-(\pi \gamma t/T_s)^2} \qquad (1)$$

where $T_s$ is the duration of a symbol $a_i$, and Sinc( ) is the cardinal sine function $$\left(\text{Sinc}(x) = \frac{\sin \pi x}{\pi x}\right).$$

The approximation can be made by choosing the real coefficients $\alpha$, $\beta$ and $\gamma$. This provides digital filters whose restriction to a finite length is as accurate as possible by virtue of the fast decay of the Gaussian function. The secondary lobes caused by the limitation of the digital filter length are thus minimised.

The following step consists in defining the phase filter 15. The characteristics of this filter 15 are closely related to those of the digital filter 17. A heuristic method is given hereunder based on the following mathematical property: the energy of a complex function $e^{jm(t)}$ with unitary modulus is maximum in a filter whose spectral power template is the Fourier transform of a function h(t) (in other words, that energy is minimum outside the filter) if it satisfies the following equation:

$$\int h(u-t) \cdot e^{jm(t)} dt = \lambda(u) \cdot e^{jm(u)}$$

where $\lambda(u)$ is a real function.

The following algorithm is used to define the phase filter 15:

1) A power template filter is selected, i.e. a function h(t) whose Fourier transform represents the required spectral template. A filter identical to the one selected as the I-Q filter is typically chosen. Other choices are obviously possible. In general, it is preferable to use a filter whose digital implementation with a fairly short finite impulse response is possible.

2) A function $\phi_0$ equal to 0 where t<0, equal to $\Delta\phi_{max} t/T_s$ where $0 \leq t \leq T_s$ and equal to $\Delta\phi_{max}$ where $t > T_s$ is used as a first approximation of the phase change function, i.e. of the function available at the output of the phase filter when the maximum phase increment $\Delta\phi_{max}$ is fed to the accumulator 11. Other approximations using continuous functions equal to 0 where t<0 and $\Delta\phi_{max}$ where $t > T_s$ could be used.

3) A function $\phi_n$ is calculated iteratively using the following formula:

$$\Phi_{n+1}(u) = \frac{\int h(u-t) \cdot \Phi_n(t) dt}{\left|\int h(u-t) \cdot \Phi_n(t) dt\right|}$$

4) The $n^{th}$ approximation of the impulse response of the phase filter, which is equal to the derivative of the function $\Phi_n$, is calculated. An approximation of this derived function can also be made using an approximate analytical formula in order to facilitate subsequent calculations. The analytical formula may be as follows:

$$g(t) = \text{Sinc}(\alpha' t/T_s) \cdot \text{Sinc}(\beta' t/T_s) \cdot e^{-(\pi \gamma' t/T_s)^2} \qquad (2)$$

where $\alpha'$, $\beta'$ and $\gamma'$ are real coefficients.

5) For one of these approximations (for example n=2 or 3), the characteristics of the modulation are evaluated with respect to the criteria of interference power in adjacent frequency channel, variation in amplitude and noise immunity. If the approximation is unsuitable, the calculations 1) to 4) are repeated by modifying the values of the phase increments, and/or by modifying the shape of the I-Q filter 17, and/or by modifying the shape of the filter referred to under 1), and/or by modifying the approximation of the phase filter obtained using the algorithm.

The retained phase filter is then implemented as a finite impulse response digital filter.

The phase filter 15 of the modulator of FIG. 1 could be replaced by a bank of phase filters selected in accordance with the origin of the symbol stream $a_i$. This could provide a phase filter 15 optimised for cases where the redundancy encoder 12 is not used, and another one optimised for cases where the encoder 12 is used.

In a particular embodiment of the invention, the duration $T_s$ of a symbol $a_i$ is 125 $\mu s$. The number of bits per symbol is 2, the phase increments being $-\pi$, $-\pi/3$, $\pi/3$ or $\pi$. The bit rate is then 16 kbit/s. The spectral specifications are those of the ETSI standard 300-113. The finite impulse response of the phase filter 15 has a length of 4 symbols and the form (2) with $\alpha'=0.77$, $\beta'=0.5$ and $\gamma'=0$. The finite impulse response of the I-Q filter 17 has a length of 8 symbols and the form (1) with $\alpha=1.6$, $\beta=0.1$ and $\gamma=0.12$. The values specified for the filter parameters could be replaced by values of the same order.

Figure 3:
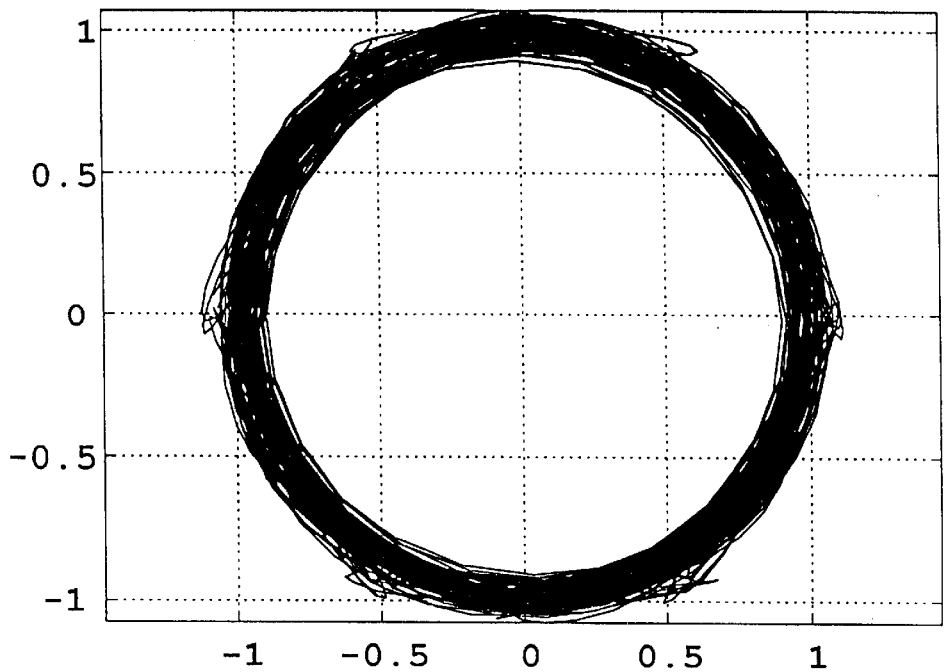
FIGS. 3 and 4 are graphs respectively showing the constellation and spectrum of a digital modulator according to the invention.

The constellation corresponding to that modulation is shown in FIG. 3. A very small variation in amplitude will be noted, since the ratio between the maximum instantaneous power and the average power is only 1.2 dB, whereas the ratio between the maximum and minimum instantaneous powers is less than 2.4 dB. Because of these characteristics, the modulation can be used with weakly linearized power amplifiers, easy to adjust and having an efficiency very close to that of saturated amplifiers.

Figure 4:
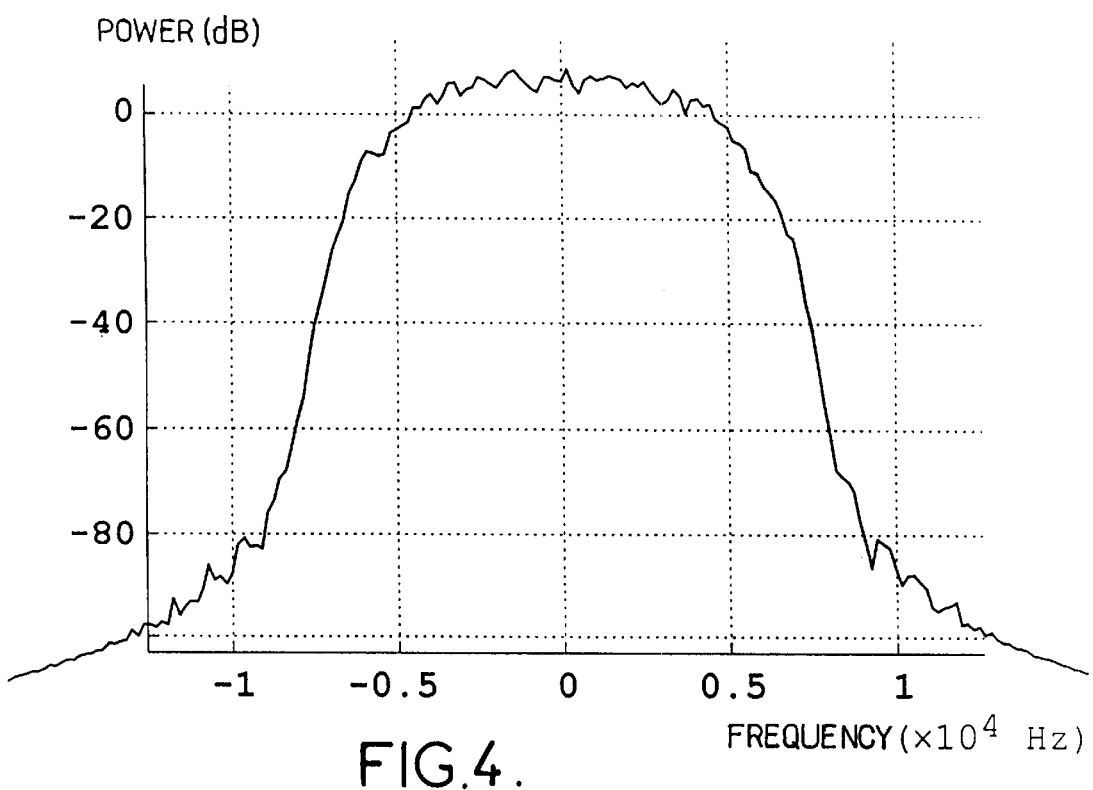

The spectrum is shown in FIG. 4. It can be noted that the level of adjacent channel interference is very low and compatible with the most demanding standards.

The noise immunity performance is excellent since, with a channel affected by Gaussian white noise, an error rate of 1% is noted for a signal-to-noise ratio $E_b/N_0$ of 5.5 dB in the case of stationary stations, whereas the same error rate of 1% is obtained for a signal-to-noise ratio $E_b/N_0$ of 16 dB in a dynamic case (speed of 70 km/h and carrier at 400 MHz). These error rates are obtained using simple conventional demodulators (FIG. 2), i.e. trellis demodulators with a very small number of states. A trellis with only three states can be used in the example shown.

In the same embodiment of the invention, the optional redundancy encoder 12 permits the implementation of a coded modulation. Here, the redundancy coding is a convolutional coding of rate ½, the bit rate then being 8 kbit/s. The filter values are identical, and a trellis with only four states may be used at the demodulator. The coding gain is of the order of 2.5 dB, and an error rate of 1% is noted with $E_b/N_0$=3.4 dB on a channel affected by Gaussian white noise in a stationary case.

FIG. 5 shows, in normalized units, the evolution of the phase variation at the output of the phase filter 15 (defined as in the above-mentioned example, i.e. with $\alpha'$=0.77, $\beta'$=0.5 and $\gamma'$=0) in response to a phase increment $\Delta\phi$ accumulated by summator 11. In other words, the illustrated phase variation, or phase step, is the time integral of the filter response.

It is observed that, due to the cardinal sine functions in the definition of the filter characteristics, the impulse response (proportional to the slope of the phase step) has both negative and positive terms: the phase step is first decreasing, then increasing and finally decreasing. This is a typical result of the above-described heuristic method. Such non-monotonic behaviour is usually avoided in conventional CPM modulations (HCS, raised cosine, etc.), because it tends to increase the intersymbol interference (ISI), and thus the complexity of the demodulator. However, it provides the advantage of strongly limiting the secondary lobes in the spectral power density.

That sort of non-monotonic behaviour can be encountered, in equivalent form, in some frequency modulation schemes wherein the symbols are converted into frequency steps processed by a frequency filter. This occurs in the C4FM modulation used in the TIA 102 CAI standard, in which the modulation index is k/P=¼, the quaternary (M=4) symbol rate is $R_s$=1/$T_s$=4.8 kHz and the frequency steps are ±1.8 kHz and ±0.6 kHz (the maximum frequency step is $\Delta f_{max}$=1.8 kHz, corresponding to $\Delta f_{max}$=$\Delta\phi_{max}$/($2\pi T_s$) with $\Delta\phi_{max}$=[(M−1)/P]$\pi$=$3\pi/4$ in the phase modulation paradigm).

The purpose of the frequency filter is to attenuate the harmonics. It is a Nyquist filter, so that its attenuation is 3 dB at half the symbol rate $R_s$/2=1/($2T_s$). In the typical case of the C4FM modulation, $R_s$/2=2.4 kHz and there is virtually no attenuation at the maximum frequency excursion $\Delta f_{max}$<<$R_s$/2. The spectral bandwidth of the frequency modulation is thus rather poor.

In contrast, the phase filter advantageously used in the present invention has a strong attenuation, higher than 3 dB, at the frequency excursion $R_s$/2=1/($2T_s$). In the above-described example, $R_s$/2=4 kHz corresponds to $\Delta f_{max}$= $\Delta\phi_{max}$/($2\pi T_s$) at which the attenuation is about 14 dB (FIG. 6). The main spectral lobe is thus very narrow, while the secondary lobes are strongly attenuated owing to the non-monotonic behaviour of the phase step.

The phase step shown in FIG. 5 implies a relatively long memory in the phase filter 15 of the modulator (L=4). However, a good compromise can be found to avoid too much complexity at the receiver, because the beneficial effect on the attenuation of the secondary lobes is more important than the undesirable effect on the ISI when the negative slopes of the phase step remains moderate, as shown. As indicated hereabove, a trellis demodulator with only three states was found to be satisfactory in the example considered.

When a very strict transmission template is to be complied with, an additional filtering of the I and Q components is required, as illustrated by filters 17 in FIG. 1. This results in a slight amplitude variation as discussed with reference to FIG. 3.

In some applications, the transmission template is less strict, due to less steep slopes at the limits of the neighbouring channels or to lower information rate per frequency unit. In such applications, the spectral characteristics provided by the phase filter may be sufficiently good to retain a neutral filtering as the additional I-Q filtering (referring to the illustrative form (1), $\alpha \to 0$, $\beta \to 0$ and $\gamma \to 0$). In other words, the I-Q filter may be dispensed with, thereby simplifying the radio stages of the transmitter.

FIG. 7 shows a block diagram of such an alternative embodiment of the modulator according to the invention. The diagram is the same as that of FIG. 1, but without the I and Q filters 17. The real and imaginary components output by module 16 are directly fed to digital-to-analog converters 18. The elements of the modulator operate in a similar manner, the phase filter 15 having characteristics as illustrated in FIGS. 5 and 6.

We claim:

1. A digital modulation process, comprising:

converting successive symbols of a digital stream into phase increments;

obtaining an accumulated phase by adding the successive phase increments;

obtaining a modulating phase by filtering the accumulated phase;

producing a complex signal having an argument representing the modulating phase;

modulating two quadrature carrier waveforms, respectively, on the basis of said complex signal; and transmitting a radio signal resulting from a combination of the two modulated waveforms, wherein modulating includes: digitally filtering said complex signal; converting into analog form digital signals respectively obtained from real and imaginary components of the digitally filtered complex signal; subjecting said analog converted signals to anti-aliasing analog filtering and then subjecting said analog converted and anti-aliasing analog filtered signals to mixing with the two carrier waveforms.

2. The process in accordance with claim 1, wherein digitally filtering the complex signal comprises two identical filtering operations on real and imaginary components thereof.

3. The process in accordance with claim 2, wherein said filtering operations on the real and imaginary components of the complex signal provide a finite impulse response corresponding to a time characteristic having the form:

$$f(t)=\text{Sinc}(\alpha t/T_s).\text{Sinc}(\beta t/T_s).e^{-(\pi \gamma t/T_s)^2},$$

where $T_s$ is a symbol period in the digital stream, α, β and γ are real coefficients, and Sinc( ) is the cardinal sine function.

4. The process in accordance with claim 3, wherein obtaining the modulating phase includes filtering the accumulated phase with a finite impulse response corresponding to a time characteristic having the form:

$$g(t)=\text{Sinc}(\alpha' t/T_s).\text{Sinc}(\beta' t/T_s).e^{-(\pi \gamma' t/T_s)^2},$$

where α', β' and γ' are real coefficients.

5. A digital modulator comprising:
   means for converting successive symbols of a digital stream into phase increments;
   a summator for accumulating the successive phase increments to produce an accumulated phase;
   a phase filter receiving the accumulated phase and producing a modulating phase;
   means for producing a complex signal having an argument representing the modulating phase; and
   a modulator for respectively modulating two quadrature carrier waveforms on the basis of said complex signal, and for transmitting a radio signal resulting from a combination of the two modulated waveforms,
   wherein the modulator comprises a digital filter to which said complex signal is applied, digital-to-analog converters respectively processing digital signals obtained from real and imaginary components of the digitally filtered complex signal, anti-aliasing analog filters receiving output signals from the digital-to-analog converters, and two mixers, each receiving one of the two carrier waveforms and an output signal from a respective one of the anti-aliasing filters.

6. The modulator in accordance with claim 5, wherein the digital filter to which said complex signal is applied consists of two identical filters receiving real and imaginary components thereof, respectively.

7. The modulator in accordance with claim 6, wherein the digital filter to which said complex signal is applied has a finite impulse response corresponding to a time characteristic having the form:

$$f(t)=\text{Sinc}(\alpha t/T_s).\text{Sinc}(\beta t/T_s).e^{-(\pi \gamma t/T_s)^2},$$

where $T_s$ is a symbol period in the digital stream, α, β and γ are real coefficients, and Sinc( ) is the cardinal sine function.

8. The modulator in accordance with claim 7, wherein the phase filter has a finite impulse response corresponding to a time characteristic having the form:

$$g(t)=\text{Sinc}(\alpha' t/T_s).\text{Sinc}(\beta' t/T_s).e^{-(\pi \gamma' t/T_s)^2},$$

where α', β' and γ' are real coefficients.

9. The modulator in accordance with claim 8, wherein $T_s=125$ μs, each symbol of the digital stream consists of two bits, the phase increments are −π, −π/3, π/3 or π, and α≈1.6, β≈0.1, γ≈0.12, α'≈0.77, β'≈0.5 and γ'≈0.

10. A digital modulation process, comprising:
    converting successive symbols of a digital stream into phase increments;
    obtaining an accumulated phase by adding the successive phase increments;
    obtaining a modulating phase by filtering the accumulated phase;
    producing a complex signal having an argument representing the modulating phase;
    modulating two quadrature carrier waveforms, respectively, on the basis of said complex signal; and
    transmitting a radio signal resulting from a combination of the two modulated waveforms,
    wherein obtaining the modulating phase includes filtering the accumulated phase with a finite impulse response corresponding to a time characteristic having the form:

$$g(t)=\text{Sinc}(\alpha' t/T_s).\text{Sinc}(\beta' t/T_s).e^{-(\pi \gamma' t/T_s)^2},$$

where $T_s$ is a symbol period in the digital stream, α', β' and γ' are real coefficients, and Sinc( ) is the cardinal sine function.

11. The process in accordance with claim 10, wherein $T_s=125$ μs, each symbol of the digital stream consists of two bits, the phase increments are −π, −π/3, π/3 or π, and α'≈0.77, β'≈0.5 and γ'≈0.

12. A digital modulator comprising:
    means for converting successive symbols of a digital stream into phase increments;
    a summator for accumulating the successive phase increments to produce an accumulated phase;
    a phase filter receiving the accumulated phase and producing a modulating phase;
    means for producing a complex signal having an argument representing the modulating phase; and
    a modulator for respectively modulating two quadrature carrier waveforms on the basis of said complex signal, and for transmitting a radio signal resulting from a combination of the two modulated waveforms,
    wherein the phase filter has a finite impulse response corresponding to a time characteristic having the form:

$$g(t)=\text{Sinc}(\alpha' t/T_s).\text{Sinc}(\beta' t/T_s).e^{-(\pi \gamma' t/T_s)^2},$$

where $T_s$ is a symbol period in the digital stream, α', α' and γ' are real coefficients, and Sinc( ) is the cardinal sine function.

13. The modulator in accordance with claim 12, wherein $T_s=125$ μs, each symbol of the digital stream consists of two bits, the phase increments are −π, −π/3, π/3 or π, and α'≈0.77, β'≈0.5 and γ'≈0.

14. A digital modulation process, comprising:
    converting successive symbols of a digital stream into phase increments;
    obtaining an accumulated phase by adding the successive phase increments;
    obtaining a modulating phase by filtering the accumulated phase;
    producing a complex signal having an argument representing the modulating phase;
    modulating two quadrature carrier waveforms, respectively, on the basis of said complex signal; and
    transmitting a radio signal resulting from a combination of the two modulated waveforms,
    wherein obtaining the modulating phase includes filtering the accumulated phase in a phase filter with a finite impulse response having both positive and negative terms,
    and wherein the phase filter has a frequency response providing an attenuation substantially higher than 3 dB for a frequency excursion of ½$T_s$, where $T_s$ is a symbol period in the digital stream.

15. The process in accordance with claim 14, wherein the finite impulse response of the phase filter corresponds to a time characteristic having the form:

$$g(t)=\text{Sinc}(\alpha' t/T_s).\text{Sinc}(\beta' t/T_s).e^{-(\pi\gamma' t/T_s)^2},$$

where $\alpha'$, $\beta'$ and $\gamma'$ are real coefficients, and Sinc( ) is the cardinal sine function.

16. The process in accordance with claim 15, wherein $T_s=125\ \mu s$, each symbol of the digital stream consists of two bits, the phase increments are $-\pi$, $-\pi/3$, $\pi/3$ or $\pi$, and $\alpha'\approx0.77$, $\beta'\approx0.5$ and $\gamma'\approx0$.

17. A digital modulator comprising:
 means for converting successive symbols of a digital stream into phase increments;
 a summator for accumulating the successive phase increments to produce an accumulated phase;
 a phase filter receiving the accumulated phase and producing a modulating phase;
 means for producing a complex signal having an argument representing the modulating phase; and
 a modulator for respectively modulating two quadrature carrier waveforms on the basis of said complex signal, and for transmitting a radio signal resulting from a combination of the two modulated waveforms,
 wherein the phase filter has a finite impulse response having both positive and negative terms, and a frequency response providing an attenuation substantially higher than 3 dB for a frequency excursion of $\frac{1}{2}T_s$, where $T_s$ is a symbol period in the digital stream.

18. The modulator in accordance with claim 17, wherein the finite impulse response of the phase filter corresponds to a time characteristic having the form:

$$g(t)=\text{Sinc}(\alpha' t/T_s).\text{Sinc}(\beta' t/T_s).e^{-(\pi\gamma' t/T_s)^2},$$

where $\alpha'$, $\beta'$ and $\gamma'$ are real coefficients, and Sinc( ) is the cardinal sine function.

19. The modulator in accordance with claim 18, wherein $T_s=125\ \mu s$, each symbol of the digital stream consists of two bits, the phase increments are $-\pi$, $-\pi/3$, $\pi/3$ or $\pi$, and $\alpha'\approx0.77$, $\beta'\approx0.5$ and $\gamma'\approx0$.

20. A digital modulation process, comprising:
 converting successive symbols of a digital stream into phase increments;
 obtaining an accumulated phase by adding the successive phase increments;
 obtaining a modulating phase by filtering the accumulated phase;
 producing a complex signal having an argument representing the modulating phase;
 modulating two quadrature carrier waveforms, respectively, on the basis of said complex signal; and
 transmitting a radio signal resulting from a combination of the two modulated waveforms,
 wherein obtaining the modulating phase includes filtering the accumulated phase in a phase filter with a finite impulse response having both positive and negative terms,
 wherein the phase filter has a frequency response providing an attenuation substantially higher than 3 dB for a frequency excursion of $\frac{1}{2}T_s$, where $T_s$ is a symbol period in the digital stream,
 and wherein modulating includes: converting into analog form digital signals respectively obtained from real and imaginary components of said complex signal; subjecting said analog converted signals to anti-aliasing analog filtering and then subjecting said analog converted and anti-aliasing analog filtered signals to mixing with the two carrier waveforms.

21. The process in accordance with claim 20, wherein the finite impulse response of the phase filter corresponds to a time characteristic having the form:

$$g(t)=\text{Sinc}(\alpha' t/T_s).\text{Sinc}(\beta' t/T_s).e^{-(\pi\gamma' t/T_s)^2},$$

where $\alpha'$, $\beta'$ and $\gamma'$ are real coefficients, and Sinc( ) is the cardinal sine function.

22. The process in accordance with claim 21, wherein $T_s=125\ \mu s$, each symbol of the digital stream consists of two bits, the phase increments are $-\pi$, $-\pi/3$, $\pi/3$ or $\pi$, and $\alpha'\approx0.77$, $\beta'\approx0.5$ and $\gamma'\approx0$.

23. A digital modulator comprising:
 means for converting successive symbols of a digital stream into phase increments;
 a summator for accumulating the successive phase increments to produce an accumulated phase;
 a phase filter receiving the accumulated phase and producing a modulating phase;
 means for producing a complex signal having an argument representing the modulating phase; and
 a modulator for respectively modulating two quadrature carrier waveforms on the basis of said complex signal, and for transmitting a radio signal resulting from a combination of the two modulated waveforms,
 wherein the phase filter has a finite impulse response having both positive and negative terms, and a frequency response providing an attenuation substantially higher than 3 dB for a frequency excursion of $\frac{1}{2}T_s$, where $T_s$ is a symbol period in the digital stream,
 and wherein the modulator comprises digital-to-analog converters respectively processing digital signals directly representing real and imaginary components of said complex signal, anti-aliasing analog filters receiving output signals from the digital-to-analog converters, and two mixers, each receiving one of the two carrier waveforms and an output. signal from a respective one of the anti-aliasing filters.

24. The modulator in accordance with claim 23, wherein the finite impulse response of the phase filter corresponds to a time characteristic having the form:

$$g(t)=\text{Sinc}(\alpha' t/T_s).\text{Sinc}(\beta' t/T_s).e^{-(\pi\gamma' t/T_2)^2},$$

where $\alpha'$, $\beta'$ and $\gamma'$ are real coefficients, and Sinc( ) is the cardinal sine function.

25. The modulator in accordance with claim 24, wherein $T_s=125\ \mu s$, each symbol of the digital stream consists of two bits, the phase increments are $-\pi$, $-\pi/3$, $\pi/3$ or $\pi$, and $\alpha'\approx0.77$, $\beta'\approx0.5$ and $\gamma'\approx0$.

* * * * *